United States Patent [19]
Zander et al.

[11] Patent Number: 5,270,760
[45] Date of Patent: Dec. 14, 1993

[54] FILM CASSETTE WITH INTERNAL FILM DRIVE

[75] Inventors: Dennis R. Zander, Penfield; David C. Smart, Rochester, both of N.Y.

[73] Assignee: Eastman Kodak Company, Rochester, N.Y.

[21] Appl. No.: 952,555

[22] Filed: Sep. 28, 1992

[51] Int. Cl.$^5$ .............................................. G03B 17/26
[52] U.S. Cl. .................................... 354/275; 242/71.1; 242/71.8
[58] Field of Search .............. 354/275; 242/71.1, 71.8, 242/71.9

[56] References Cited

U.S. PATENT DOCUMENTS

| | | | |
|---|---|---|---|
| 4,832,275 | 5/1989 | Robertson | 242/71.1 |
| 4,834,306 | 5/1989 | Robertson et al. | 242/71.1 |
| 4,887,112 | 12/1989 | Niedospial, Jr. et al. | 354/275 |
| 5,031,852 | 7/1991 | Dowling | 242/71.1 |
| 5,200,777 | 4/1993 | Zander | 354/275 |
| 5,209,419 | 5/1993 | Zander | 354/275 X |

FOREIGN PATENT DOCUMENTS

4002788A1 8/1990 Fed. Rep. of Germany .

Primary Examiner—Michael L. Gellner
Assistant Examiner—Jae N. Noh
Attorney, Agent, or Firm—Roger A. Fields

[57] ABSTRACT

A film cassette comprises a spool core supported for rotation in an unwinding direction about an axis, a film-strip coiled about the spool core to form a film roll, and annular constraining means supported for rotation about the axis of the spool core but inclined with respect to the axis to position the constraining means partially encircling an outermost convolution of the film roll to confine the outermost convolution and partially not encircling the outermost convolution to allow a leading end of the film roll to escape confinement of the outermost convolution when the spool core is rotated in the unwinding direction. The spool core and the annular constraining means include respective engagement means for engaging when the spool core is rotated in the unwinding direction, to make the constraining means rotate with the spool core in the same direction. An inner face of the annular constraining means and a longitudinal edge of the outermost convolution of the film roll include respective connection means for interlocking only along where the constraining means is encircling the outermost convolution, to cause the constraining means to drive the outermost convolution without any slippage when the constraining means is made to rotate with the spool core in the unwinding direction.

2 Claims, 11 Drawing Sheets

FILM CASSETTE WITH INTERNAL FILM DRIVE

BACKGROUND OF THE INVENTION

1. Field of the Invention

The invention relates generally to the field of photography, and in particular to a film cassette containing a film roll. More specifically, the invention relates to a film cassette capable of advancing a film leader from inside the cassette shell to outside the cassette shell responsive to unwinding rotation of a spool supporting the film roll.

2. Description of the Prior Art

Commonly assigned U.S. Pat. No. 4,832,275, issued May 23, 1989 discloses a film cassette wherein a spool core is supported inside a cassette shell for rotation in an unwinding direction about an axis, a film roll coiled about the spool core is advanced with a leading film end at an outermost convolution of the film roll from inside the cassette shell to outside the cassette shell in response to rotation of the spool core in the unwinding direction, and a pair of rigid constraining rings are supported for rotation about separate axes each inclined with respect to the axis of the spool core to position the constraining rings partially encircling the outermost film convolution to radially confine the outermost film convolution in order to prevent it from clockspringing against an interior curved wall of the cassette shell and to position the constraining rings partially not encircling the outermost film convolution to allow the outermost film convolution beginning with the leading film end to escape radial confinement of the constraining rings when the spool core is rotated in the unwinding direction.

PROBLEM TO BE SOLVED BY THE INVENTION

In U.S. Pat. No. 4,832,275, when the spool core is initially rotated in the unwinding direction the constraining rings may remain stationary and the film roll, since its inner trailing end is attached to the spool core, will tend to expand radially until the outermost convolution of the film roll is tightly jammed against respective inner faces of the constraining rings. Then, continued rotation of the spool core in the unwinding direction will similarly rotate the constraining rings to drive the outermost film convolution in the same direction.

Thus, the constraining rings cannot drive the outermost convolution of the film roll in the unwinding direction until a non-slipping relation is created between the outermost convolution and the inner faces of the constraining rings. Moreover, depending upon ambient temperature and humidity conditions it cannot be assured that the non-slipping relation will be absolute, i.e. some slippage may occur,

SUMMARY OF THE INVENTION

A film cassette comprising a spool core supported for rotation in an unwinding direction about an axis, a filmstrip coiled about the spool core to form a film roll, and annular constraining means supported for rotation about an axis inclined with respect to the axis of the spool core to position the constraining means partially encircling an outermost convolution of the film roll to confine the outermost convolution and partially not encircling the outermost convolution to allow a leading end of the film roll to escape confinement of the outermost convolution when the spool core is rotated in the unwinding direction, is characterized in that:

the spool core and the annular constraining means include respective engagement means for engaging when the spool core is rotated in the unwinding direction, to make the constraining means rotate with the spool core in the same direction; and an inner face of the annular constraining means and a longitudinal edge of the outermost convolution of the film roll include respective connection means for interlocking only along where the constraining means is encircling the outermost convolution, to cause the constraining means to drive the outermost convolution without any slippage when the constraining means is made to rotate with said spool core in the unwinding direction.

Preferably, the inner face of the annular constraining means includes a series of teeth having a predetermined pitch, and the connection means on the longitudinal edge of the outermost convolution of the film roll includes a series of teeth-receiving perforations having a predetermined pitch that is greater than the pitch of the teeth.

DETAILED DESCRIPTION OF THE PREFERRED EMBODIMENT

The invention is disclosed as being embodied preferably in a 35 mm film cassette. Because the features of this type of film cassette are generally known, the description which follows is directed in particular to elements forming part of or cooperating directly with the disclosed embodiment. It is to be understood, however, that other elements not specifically shown or described may take various forms known to persons of ordinary skill in the art.

The Film Cassette—General

Figure 1:
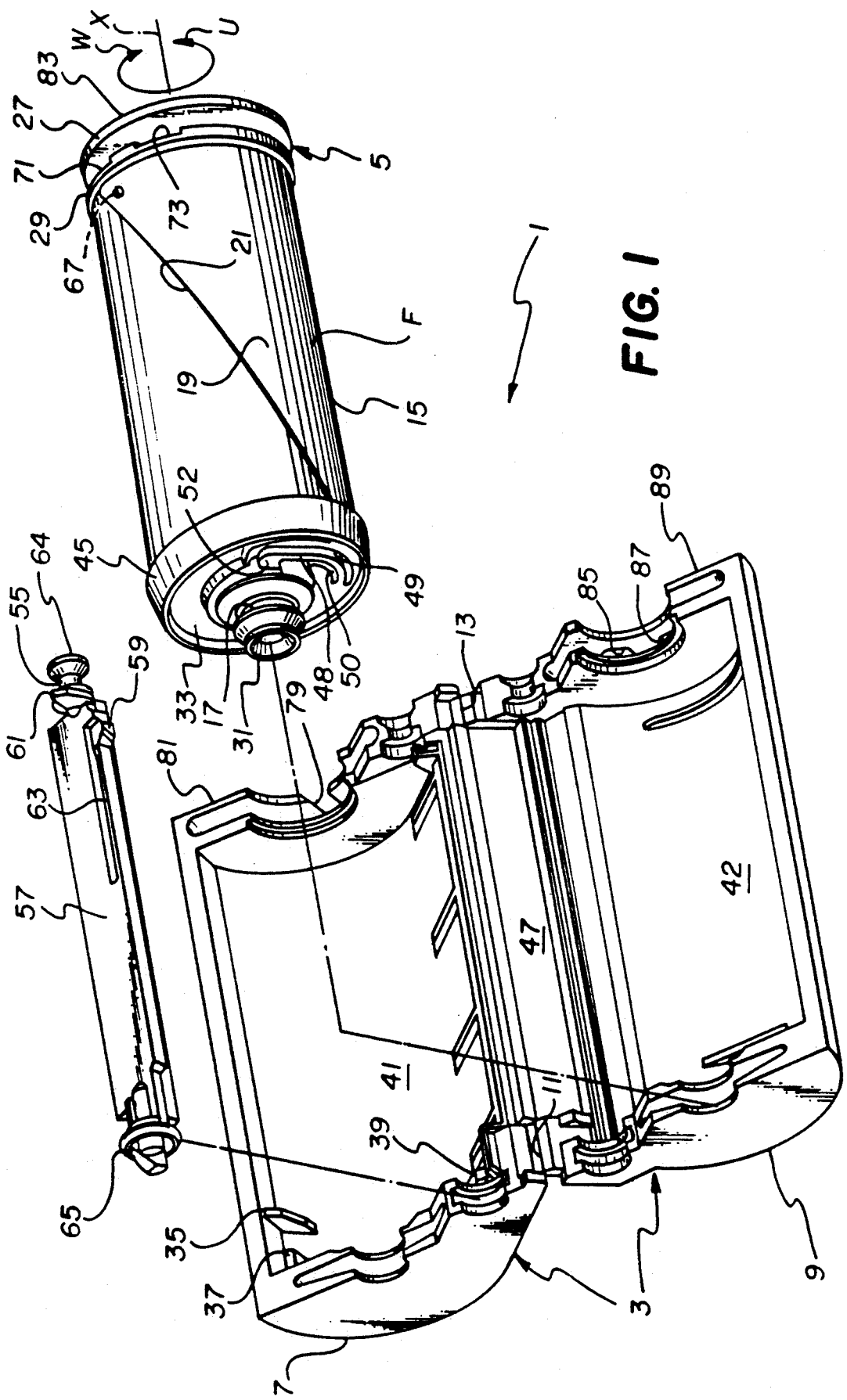
FIG. 1 is an exploded perspective view of a film cassette according to a preferred embodiment of the invention, showing two halves of the cassette shell opened and the various cassette components removed from the shell halves.
Figure 2:
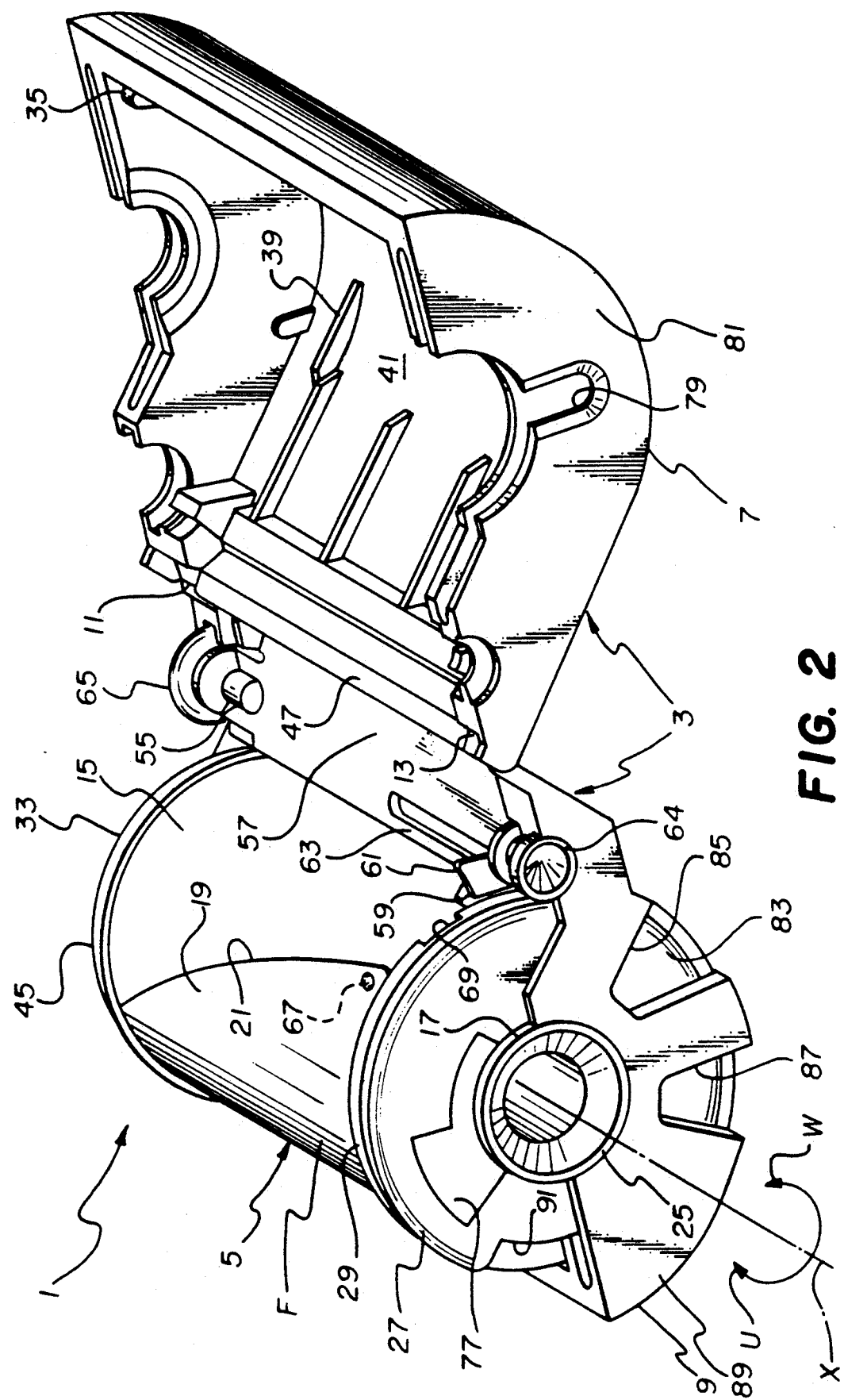
FIG. 2 is a perspective view of the film cassette, showing the two shelf halves opened with the various cassette components in place.
Figure 3:
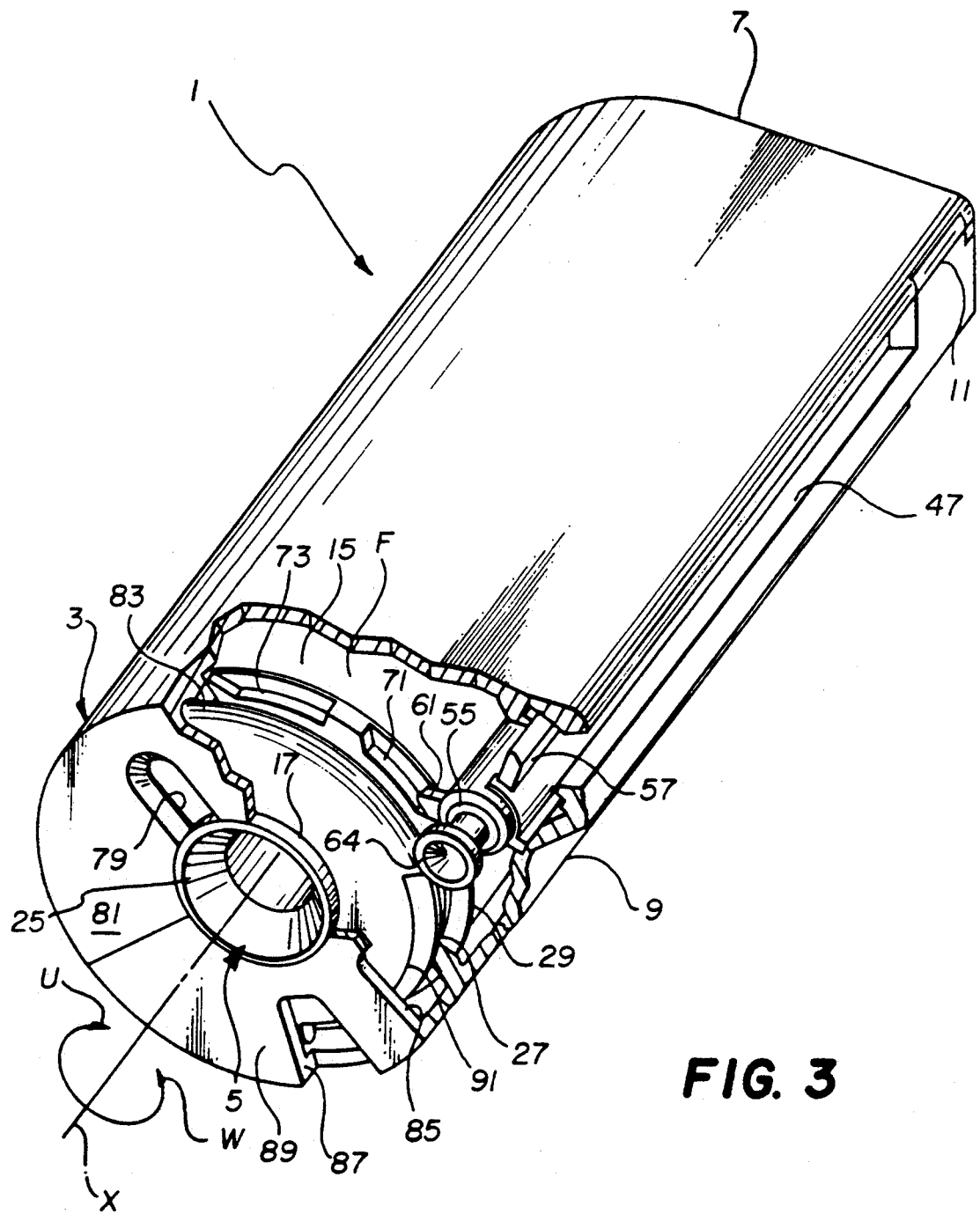
FIG. 3 is a perspective of the film cassette partly cut away.

Referring now to the drawings, FIGS. 1 and 2 show a 35 mm film cassette 1 comprising a cassette shell 3 and a film spool 5. The film spool 5 is rotatable about an axis X in film unwinding and film winding directions U and W inside the cassette shell 3. The cassette shell 3 consists of two shell halves 7 and 9 which are connected by a pair of spaced, integrally formed hinges 11 and 13 and otherwise are secured together by known means.

Figure 4:
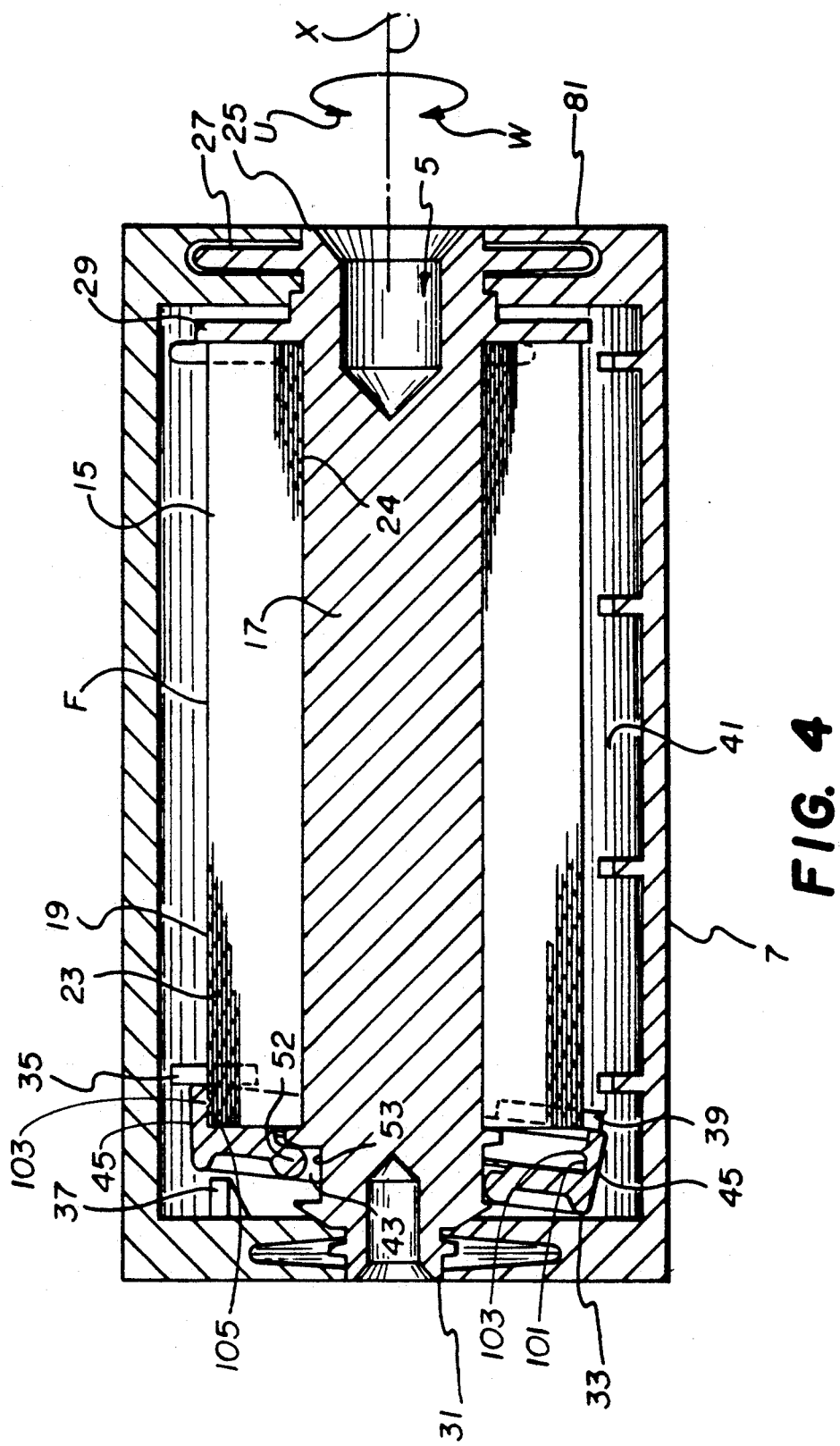
FIG. 4 is an elevation view in cross-section of the film cassette.
Figure 8:
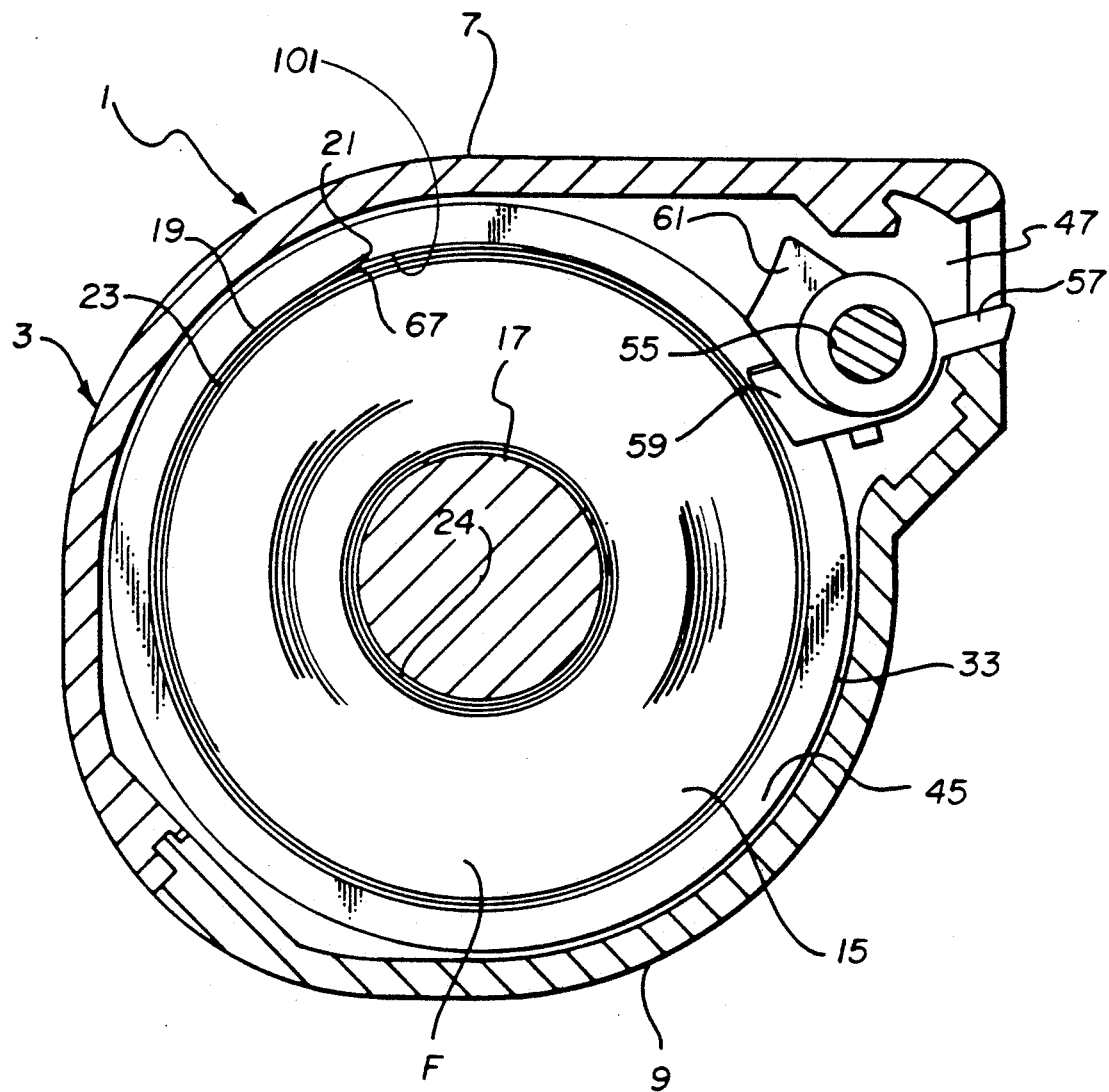

A roll 15 of 35 mm filmstrip F is coiled about a core or hub 17 of the film spool 5 to form successive convolutions of the filmstrip. As shown in FIGS. 4 and 8, the film roll 15 includes an outermost convolution which is a film leader 19 having a leading or forward inclined end 21, and it includes a next inward convolution 23 coiled beneath the outermost convolution. An inner or trailing end of an innermost convolution 24 of the film roll 15 is secured to the spool core 17 by appropriate means such as a hook or tape, not shown.

Adjacent one end 25 of the spool core 17, a pair of parallel inner and outer rigid disks 27 and 29 are integrally formed with the spool core. Both of the disks 27 and 29 are arranged perpendicular to the axis X. See FIGS. 1-4. Adjacent another end 31 of the spool core 17, a rigid flange 33 is supported inclined slightly with respect to the axis X by four disk guides 35, 37 and 39, only three shown, projecting from an inner wall 41 of the shell half 7. Other disk guides, not shown, project from an inner wall 42 of the shell half 9. The flange 33 has a central opening 43 through which the spool core 17 extends to allow rotation of the spool core about the axis X independently of the flange, and it includes an annular lip or skirt 45 which circumferentially extends from the flange. As shown in FIGS. 1 and 4, the inner disk 29 and the flange's annular lip 45 are spaced from each other a distance that is less than the width W of the filmstrip F for an approximately 270° arc that is remote from a film egress/ingress passageway 47 to outside the cassette shell 3. This positions the flange's annular lip 45 to encircle the film leader 19 along the 270° arc to radially confine the film leader 19 to the film roll 15 within that arc in order to substantially prevent clock-springing of the film roll against the respective inner walls 41, 42 of the shell halves 7, 9. Conversely, the inner disk 29 and the flange's annular lip 45 are spaced from each other a distance that is greater than the width W of the filmstrip F for an approximately 90° arc that is close to the passageway 47. This positions the flange's annular lip 45 to not encircle the film leader 19 along the 90° arc to allow the film leader 19 beginning with its leading end 21 to escape the radial confinement of the flange's annular lip at that arc in order to enter the passageway. A functionally similar arrangement is disclosed in commonly assigned U.S. Pat. No. 4,832,275, issued May 23, 1989.

Figure 5:
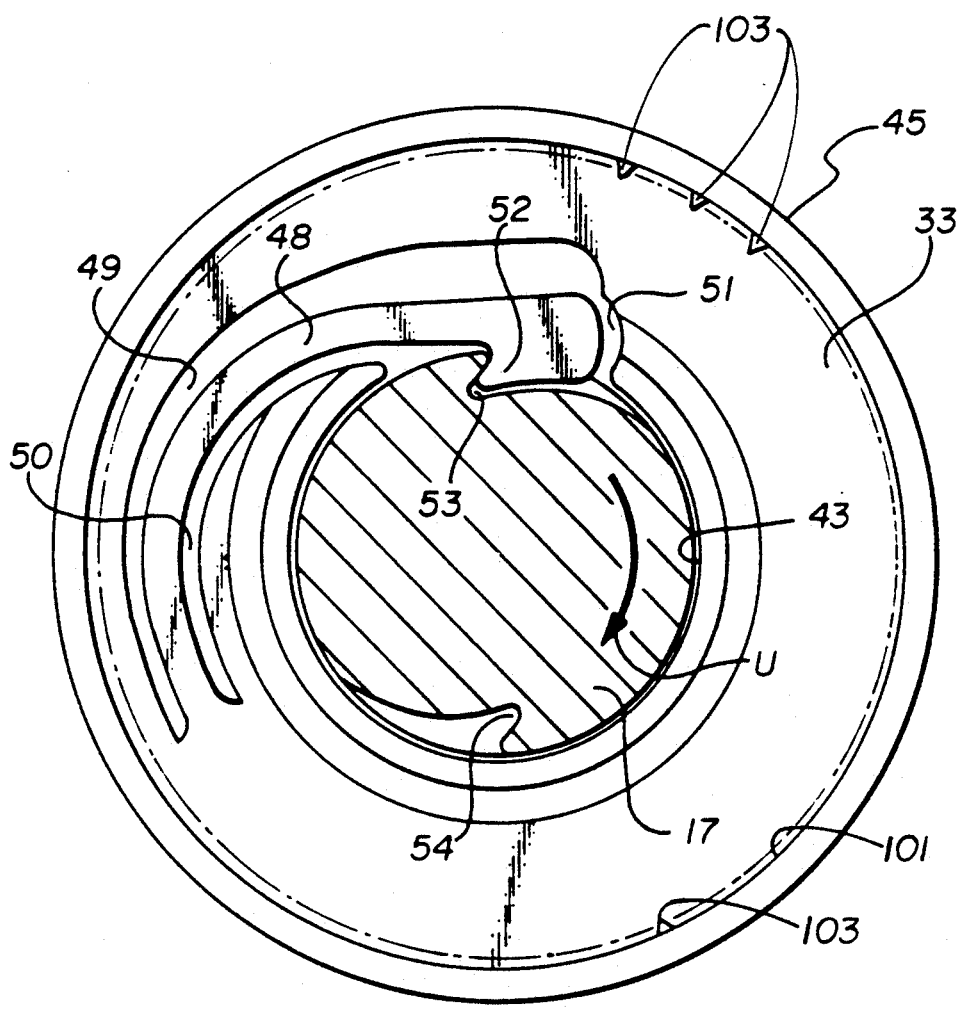
FIG. 5 is a plan view in cross-section of a flange to spool core engagement in the film cassette.
Figure 15:
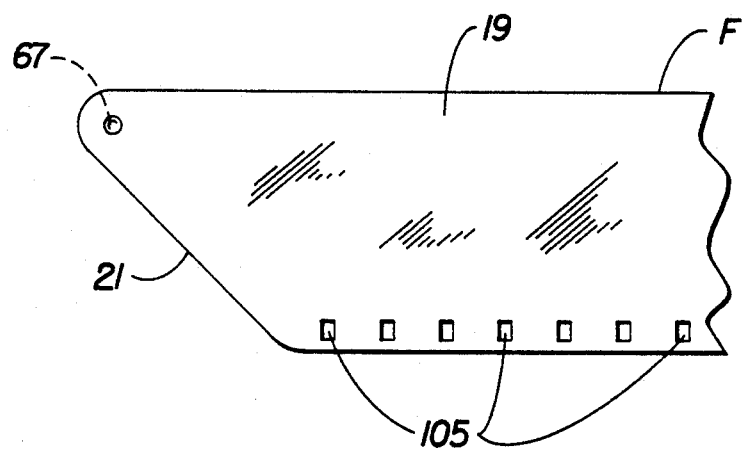
FIG. 15 is an elevation view of a perforated film leader for a filmstrip to be used with the film cassette.

The flange's annular lip 45 has an inner face 101 provided with a continuous series of evenly spaced teeth 103 as shown in FIGS. 4 and 5. The teeth 103 protrude into respective perforations 105 in the film leader 19 only along where the flange's annular lip 45 is encircling the film leader 19, i.e. along the 270° arc. See FIGS. 4 and 15. The pitch of the perforations 105 is slightly greater then the pitch of the teeth 103.

Flange To Spool Core Engagement

The flange 33 includes an integrally formed resilient cantilever 48 bordered by a pair of longitudinal slits or openings 49 and 50 cut in the flange to interconnect at a common opening 51 to the central opening 43 of the flange. See FIG. 5. The cantilever 48 has a free end portion at the common opening 51 which defines a locking pawl 52 that is inherently biased against the periphery of the spool core 17 at a location within the central opening 43, to drop into either one of two identical notches or detents 53 and 54 cut in the periphery of the spool core. When the locking pawl 52 rests against the periphery of the spool core 17, the cantilever 48 occupies the longitudinal slit 49. When the locking pawl 52 is in one of the detents 53, 54, it is removed from the longitudinal slit 49. The locking pawl 52 and the detents 53, 54 are complementarily shaped to locking engage the pawl and one of the detents when the spool core 17 is rotated relative to the flange 33 in the unwinding direction U. Once the locking pawl 52 and one of the detents 53, 54 are lockingly engaged, the flange 33 must rotate with the spool core 17 in the unwinding direction U. Conversely, the locking pawl 52 and the detents 53, 54 are complementarily shaped to disengage the pawl and one of the detents and force the pawl onto the periphery of the spool core 17 when the spool core is rotated relative to the flange 33 in the winding direction W. Another type of flange to spool core engagement arrangement is disclosed in commonly assigned U.S. Pat. No. 5,031,852, issued Jul. 16, 1991.

Unitary Film Stripper, Spool Lock and Light Valve

A control shaft 55 has an integrally formed light valve 57, film stripper 59 and spool lock 61. See FIGS. 1-4. The stripper 59 comprises the free end of a resilient cantilever 63 extending from the control shaft 55.

The control shaft 55 is rotatably supported within the cassette shell 3 by the shell halves 7 and 9. See FIGS. 1-3. Opposite ends 64 and 65 of the control shaft 55 are accessible at the exterior of the cassette shell 3 for engagement to rotate the control shaft.

Figure 6:
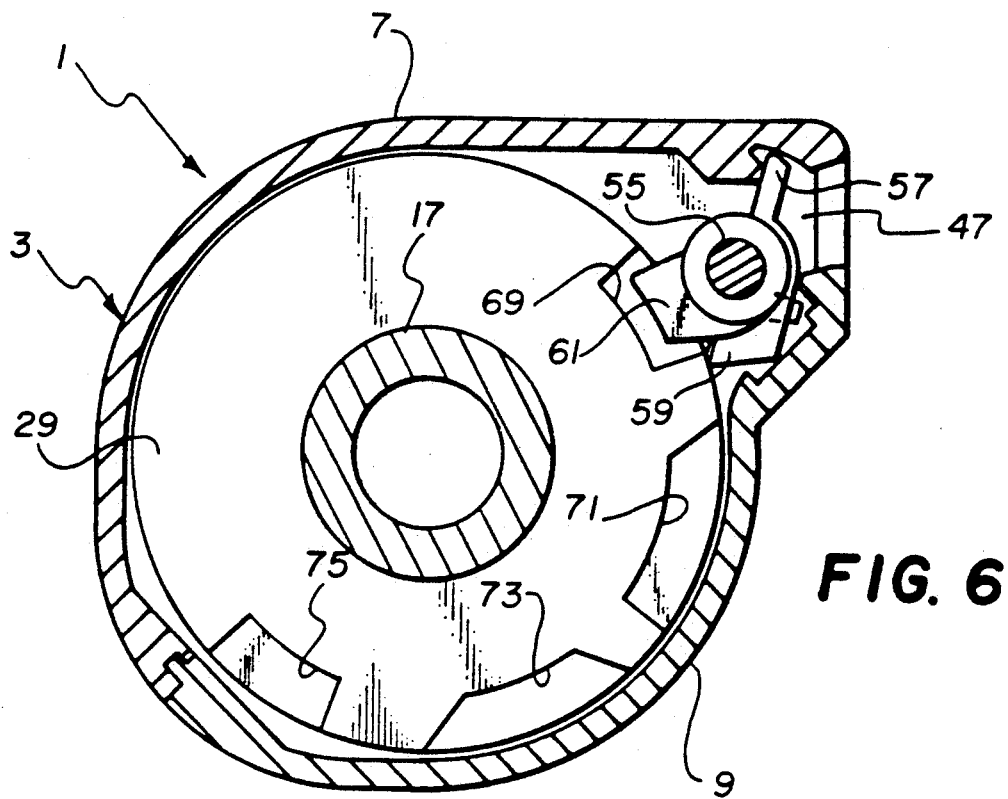
FIGS. 6–14 are either plan views in cross-section or end views of the film cassette, showing operation of a unified light valve, film stripper and spool lock.

As shown in FIG. 6, when the control shaft 55 is rotationally oriented with the light valve 57 in a light blocking or closed position extending across the film egress/ingress passageway 47 to prevent ambient light from entering the cassette shell 3 through the passageway, the film stripper 59 is in a non-stripping position removed from the film roll 15. Conversely, as shown in FIG. 8, when the control shaft 55 is rotationally oriented with the light valve in a non-blocking or opened position to allow movement of the filmstrip F through the passageway 47, the stripper 59 is in a stripping position to be received between the leading end 21 of the film leader 19 and the next-inward convolution 23 of the film roll 15 responsive to rotation of the film spool 5 in the unwinding direction U. If the film spool 5 is rotated in the unwinding direction U with the stripper 59 in its stripping position, the film leader 19 beginning with the leading end 21 will be guided by the stripper from between the flange's annular lip 33 and the inner disk 29 into the passageway 47. A protruberance 67 may be provided on the underside of the film leader 19 at a location proximate the leading film end 21 to normally lie against the outerside of the next-inward film convolution 23, to maintain a slight space between the leading film end and the next-inward film convolution for receipt of the stripper 59. See FIG. 8.

Figure 7:
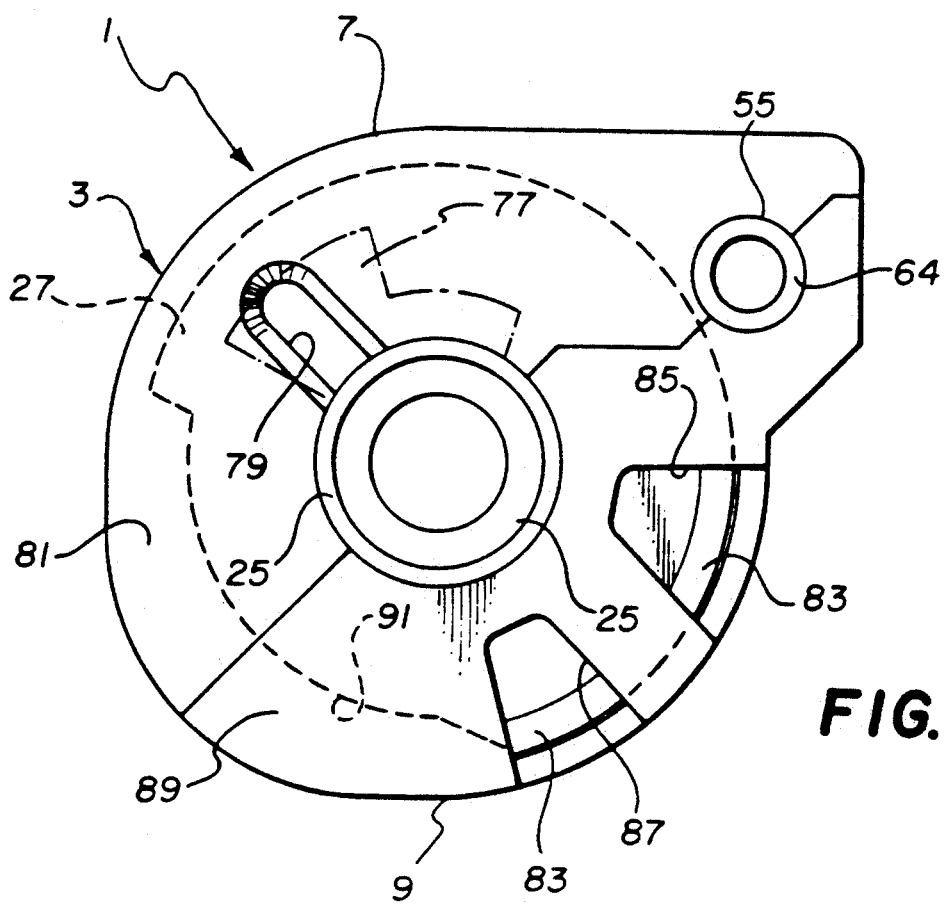

As shown in FIGS. 2 and 8, when the control shaft 55 is rotationally oriented with the light valve 57 in its non-blocking position, the spool lock 61 is in a non-locking position removed from the inner disk 29. Conversely, as shown in FIG. 6, when the control shaft 55 is rotationally oriented with the light valve 57 in its light blocking position, the spool lock 61 is in a locking position protruding into any one of four notches or detents 69, 71, 73 and 75 cut in the periphery of the inner disk 29, to prevent substantial rotation of the film spool 5 in the unwinding and winding directions U and W. When the spool lock 61 protrudes into the detent 69, the film spool 5 is rotationally arrested with a film exposure status indicator 77 completely filling a window 79 in one end 81 of the shell half 7, to visibly indicate the filmstrip F is unexposed (fresh). See FIGS. 6 and 7.

Figure 9:
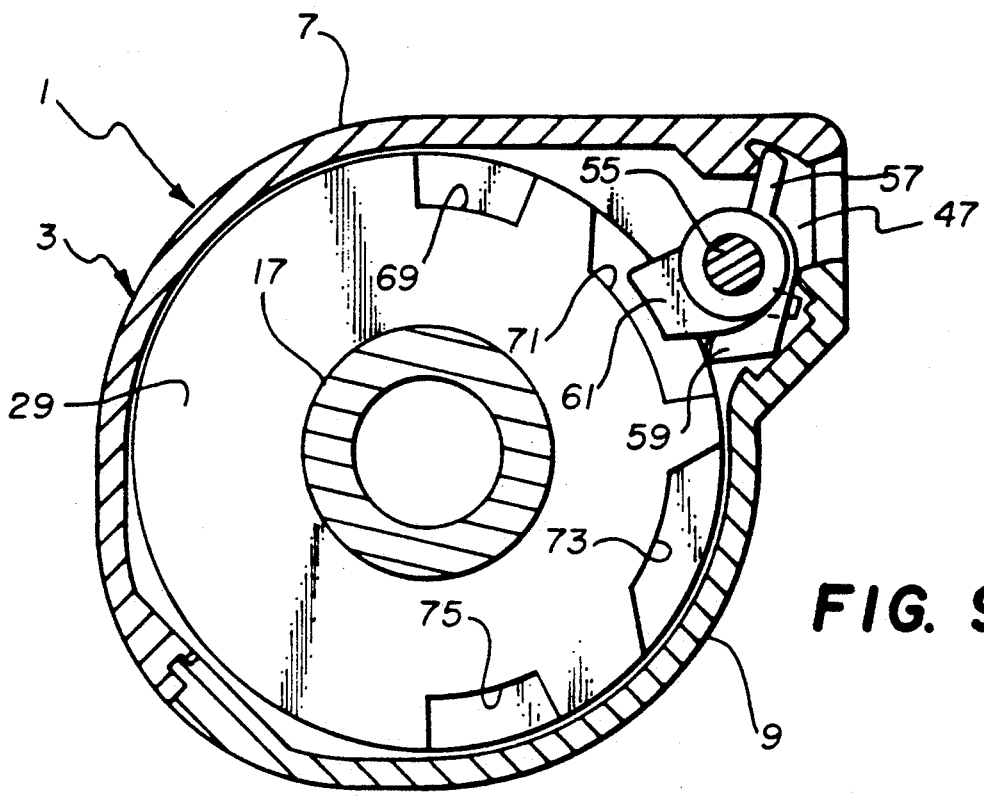
Figure 10:
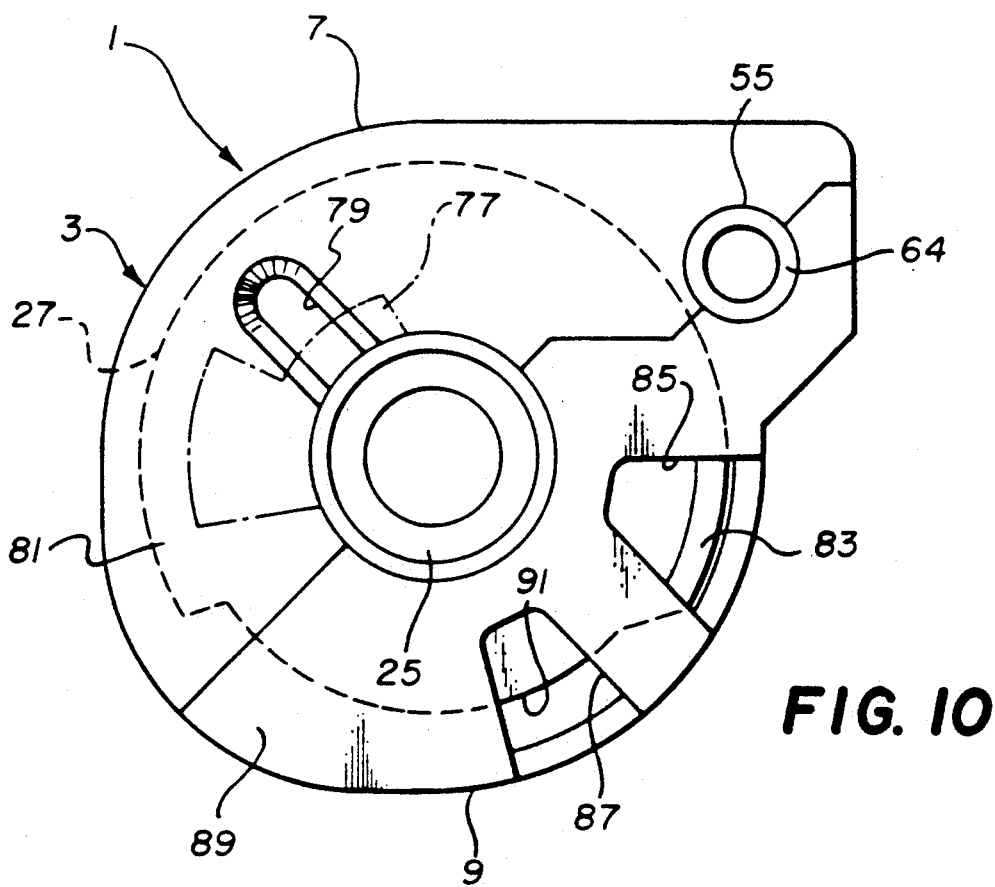
Figure 11:
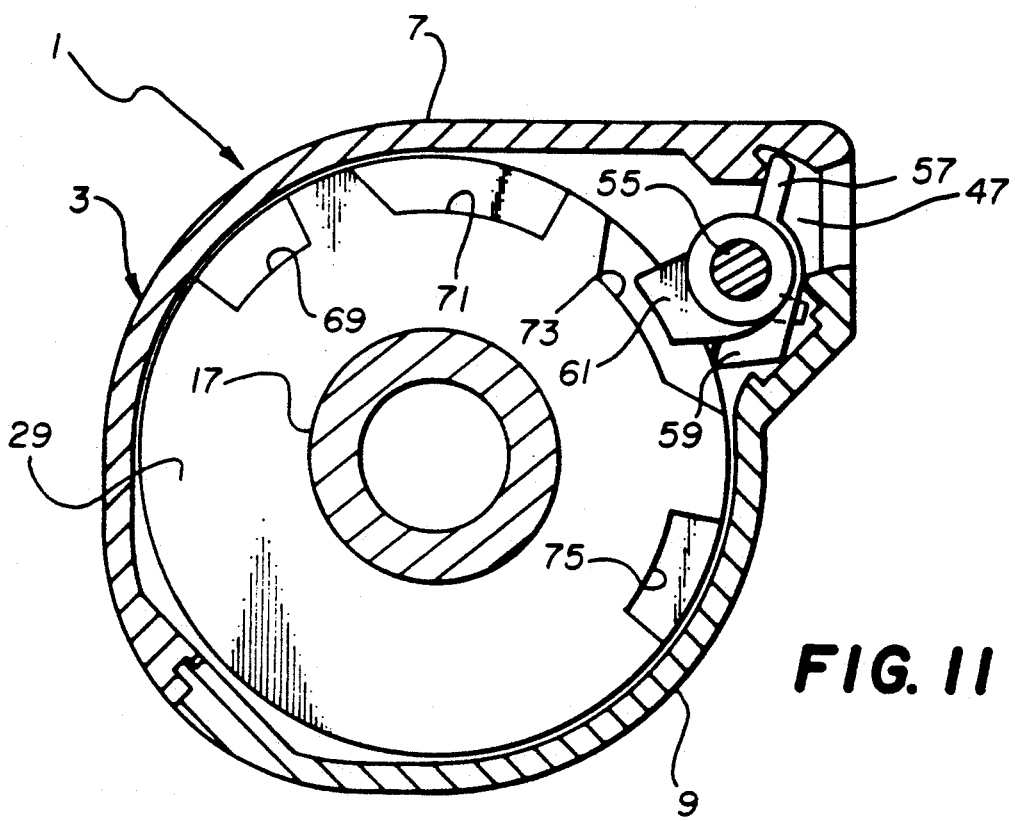
Figure 12:
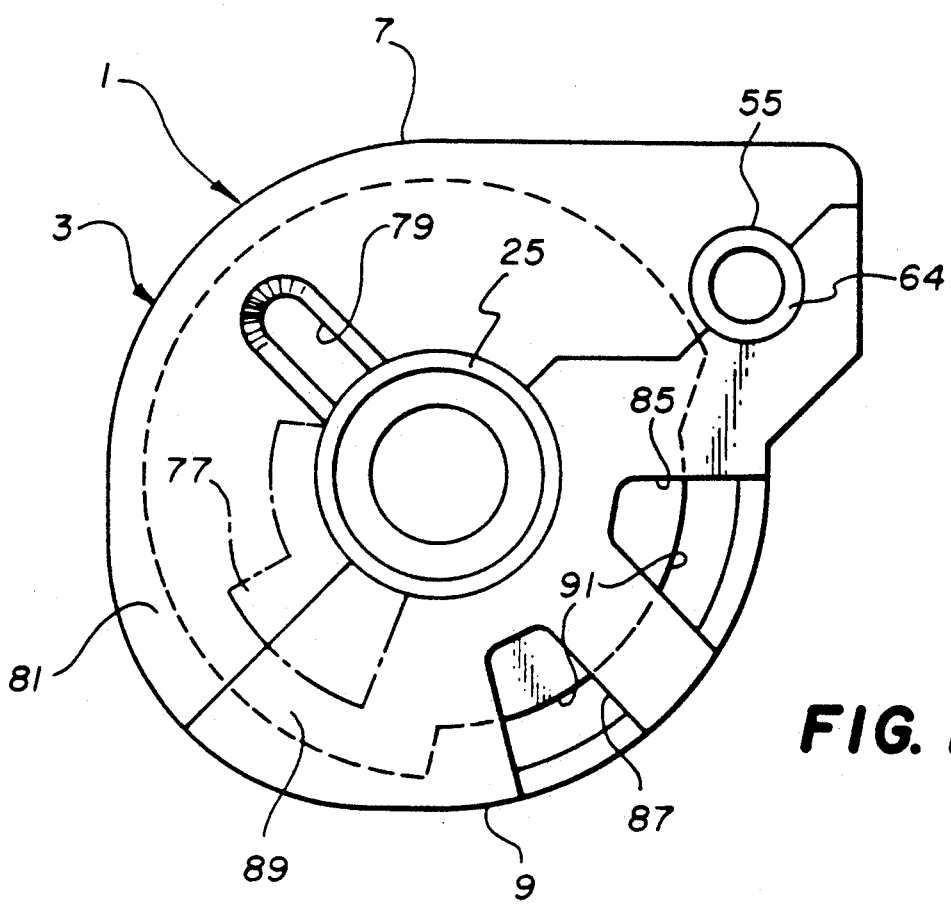
Figure 13:
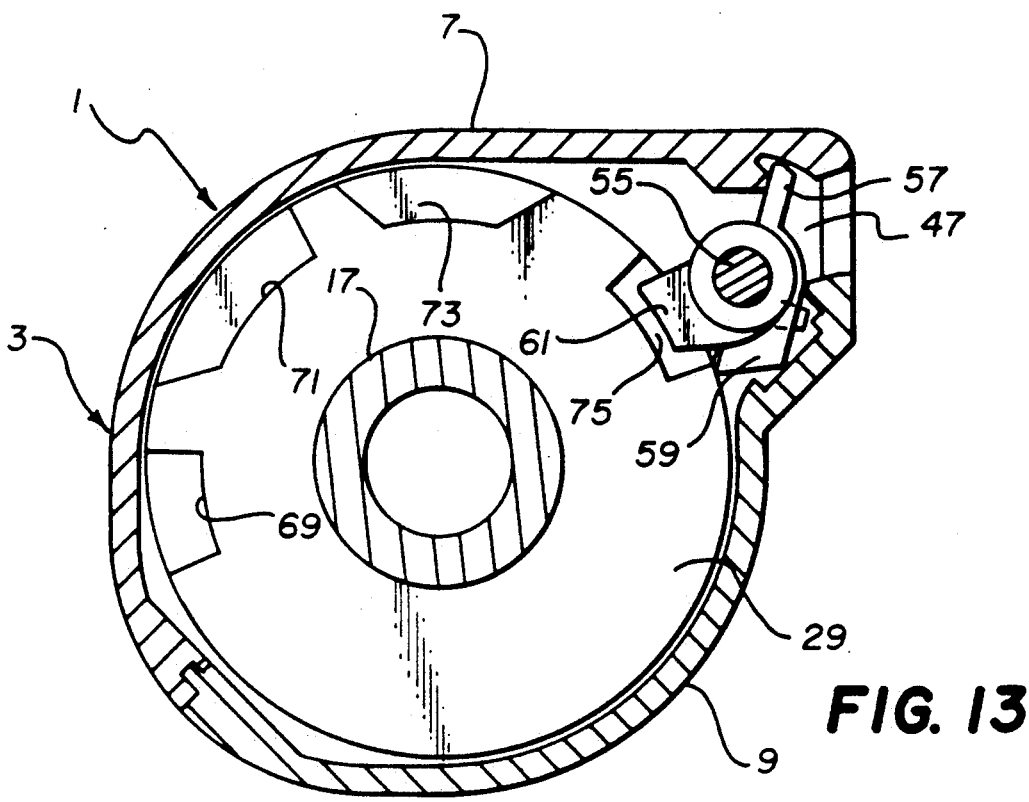
Figure 14:
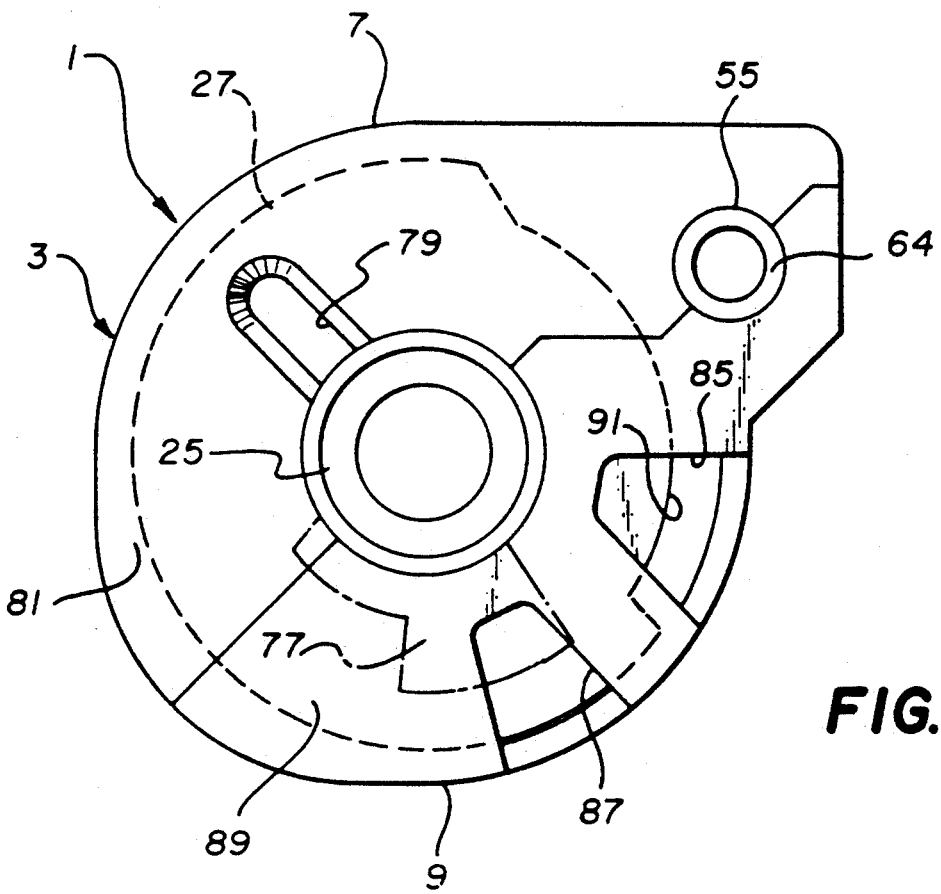

Moreover, a beveled edge portion 83 of the outer disk 27 is present at two windows 85 and 87 in the end 89 of the shell half 9, to disable a cassette load prevention mechanism in a camera or other apparatus adapted to receive the film cassette 1. See FIG. 7. An example of the cassette load prevention mechanism is disclosed in commonly assigned U.S. Pat. No. 5,032,861, issued Jul. 16,1991, and No. 5,047,794, issued Sep. 10, 1991. When the spool lock 61 protrudes into the detent 71, the film spool 5 is rotationally arrested with the exposure status indicator 77 only partly filling the window 79 to visibly indicate the filmstrip F is partly exposed. See FIGS. 9 and 10. Moreover, the beveled edge portion 83 is only present at the window 85. A cut-out edge portion 91 of the outer disk 27 is present at the window 87. See FIG. 10. Consequently, the cassette load prevention mechanism would be disabled at the window 87 but not at the window 85. This permits the film cassette 1 to be used with two different types of cameras, one that can receive the film cassette with the filmstrip F either partly exposed or unexposed and the other that can receive the film cassette only with the filmstrip unexposed. When the spool lock 61 protrudes into the detent 73, the film spool 5 is rotationally arrested with the exposure status indicator 77 completely removed from the window 79 to visibly indicate the filmstrip F is fully exposed. See FIGS. 11 and 12. Moreover, the cut-out edge portion 91 is present at the windows 85 and 87. See FIG. 12. Consequently, the cassette load prevention mechanism would be disabled at the windows 85 and 87. This is in order to prevent any type camera from receiving the film cassette 1 with the filmstrip F fully exposed. When the spool lock 61 protrudes into the detent 75, the film spool 5 is rotationally arrested with the exposure status indicator 77 completely removed from the window 79. However, another indicator, not shown, may be provided on the outer disk 27 to be present at the window 79 to visibly indicate the filmstrip F has been processed to develop any latent images. See FIGS. 13 and 14. Moreover, the cut-out edge portion 91 is present at the window 85 and the beveled edge portion 83 is present at the window 87. See FIG. 14. Consequently, the cassette load prevention mechanism would be disabled at the window 85 but not the window 87. This is in order to allow the film cassette 1 only to be received in apparatus other than a camera, such as an image display device, which would make use of the filmstrip F when it is processed.

Operation

Initially, the control shaft 55 must be rotated to move the light valve 57 from its light blocking position to its non-blocking position, to move the spool lock 61 from its locking position to its non-locking position, and to move the film stripper 59 from its non-stripping position to its stripping position. See FIGS. 6 and 7.

Then, the spool core 17 is rotated relative to the flange 33 in the unwinding direction U until the two pieces are lockingly engaged by means of the locking pawl 52 and one of the detents 53, 54. See FIG. 5. Continued rotation of the spool core 17 in the unwinding direction U will similarly rotate the flange 33 to cause the teeth 103 which protrude into the film perforations 105 to drive the film leader 19. As a result, successive longitudinal sections of the filmstrip F beginning with its leading end 21 will exit from between the flange's annular lip 45 and the inner disc 29 along the 90° arc close to the film egress/ingress passageway 47 where the lip and the disc are spaced from each other a distance that is greater than the width W of the filmstrip F, i.e. where the teeth 103 do not protrude into the film perforations 105. Simultaneously, the film stripper 59 will direct successive longitudinal sections of the filmstrip F beginning with its leading end 21 into the passageway 47 for advancement outside the cassette shell 3.

The invention has been described with reference to a preferred embodiment. However, it will be appreciated that variations and modifications can be effected within the ordinary skill in the art without departing from the scope of the invention.

I claim:

1. A film cassette comprising a spool core supported for rotation in an unwinding direction about an axis, a filmstrip coiled about said spool core to form a film roll, and annular constraining means supported for rotation about the axis of said spool core but inclined with respect to the axis to position said constraining means partially encircling an outermost convolution of said film roll to confine said outermost convolution and partially not encircling the outermost convolution to allow a leading end of the film roll to escape confinement of the outermost convolution when the spool core is rotated in the unwinding direction, is characterized in that:

said spool core and said annular constraining means include respective engagement means for engaging when the spool core is rotated in the unwinding direction, to make the constraining means rotate with the spool core in the same direction; and an inner face of said annular constraining means and a longitudinal edge of said outermost convolution of the film roll include respective connection means for interlocking only along where the constraining means is encircling the outermost convolution, to cause the constraining means to drive the outermost convolution without any slippage when the constraining means is made to rotate with said spool core in the unwinding direction.

2. A film cassette as recited in claim 1, wherein said connection means on said inner face of the annular constraining means includes a series of teeth having a predetermined pitch, and said connection means on said longitudinal edge of said outermost convolution of the film roll includes a series of teeth-receiving perforations having a predetermined pitch that is greater than the pitch of said teeth.

* * * * *